(12) United States Patent
Asbury

(10) Patent No.: US 7,648,753 B2
(45) Date of Patent: Jan. 19, 2010

(54) VEHICLE PANEL WITH REINFORCEMENT LAYER

(75) Inventor: James Daniel Asbury, New Hudson, MI (US)

(73) Assignee: Intier Automotive Inc., Newmarket (CA)

( * ) Notice: Subject to any disclaimer, the term of this patent is extended or adjusted under 35 U.S.C. 154(b) by 523 days.

(21) Appl. No.: 10/567,892

(22) PCT Filed: Aug. 11, 2004

(86) PCT No.: PCT/US2004/026323

§ 371 (c)(1), (2), (4) Date: Feb. 8, 2006

(87) PCT Pub. No.: WO2005/016700

PCT Pub. Date: Feb. 24, 2005

(65) Prior Publication Data

US 2006/0255626 A1 Nov. 16, 2006

Related U.S. Application Data

(60) Provisional application No. 60/495,931, filed on Aug. 14, 2003.

(51) Int. Cl.
*D06N 7/04* (2006.01)
(52) U.S. Cl. ...................... 428/141; 296/214
(58) Field of Classification Search ............ 442/1, 442/11, 36; 296/214, 39.1, 97.9; 428/141, 428/147, 175
See application file for complete search history.

(56) References Cited

U.S. PATENT DOCUMENTS

| 4,828,910 | A | 5/1989 | Haussling |
| 4,840,832 | A | 6/1989 | Weinle et al. |
| 4,966,799 | A | 10/1990 | Lucca et al. |
| 5,068,001 | A | 11/1991 | Haussling |
| 5,486,256 | A | 1/1996 | Romesberg et al. |
| 5,582,906 | A | 12/1996 | Romesberg et al. |
| 5,591,289 | A | 1/1997 | Souders et al. |
| 5,660,908 | A | 8/1997 | Kelman et al. |
| 5,766,395 | A | 6/1998 | Bainbridge et al. |
| 6,086,145 | A | 7/2000 | Wandyez |

(Continued)

FOREIGN PATENT DOCUMENTS

DE 19706839 8/1998

(Continued)

*Primary Examiner*—Arti Singh-Pandey
(74) *Attorney, Agent, or Firm*—Honigman Miller Schwartz and Cohn LLP

(57) ABSTRACT

A vehicle panel includes a care layer and a reinforcement layer positioned on one or both sides of the core layer. The core layer is made of a material with heat absorption or insulation properties, such as polypropylene, and the like. The reinforcement layer is comprised of fiberglass strands intermingled with a polymer to form a blended composition having a density in a range between about 50 and 200 g/m². The vehicle panel may also include an adhesive layer between a cover material and the reinforcement layer on one side of the core layer. The vehicle panel may also include a scrim material adjacent the reinforcement layer on the opposite side of the core layer. The reinforcement layer provides dimensional stability to the vehicle panel, while reducing the overall weight and thickness of the vehicle panel as compared to conventional vehicle panels.

16 Claims, 1 Drawing Sheet

U.S. PATENT DOCUMENTS

| | | | |
|---|---|---|---|
| 6,156,682 A | 12/2000 | Fletemier et al. | |
| 6,204,209 B1 | 3/2001 | Rozek et al. | |
| 6,409,947 B1 | 6/2002 | Wandyez | |
| 7,297,390 B2 * | 11/2007 | Simmons et al. | 428/178 |
| 2001/0000162 A1 | 4/2001 | Fletemier et al. | |
| 2001/0046587 A1 | 11/2001 | Michael et al. | |
| 2002/0145236 A1 | 10/2002 | Wandyez | |
| 2003/0098614 A1 | 5/2003 | Shields | |
| 2003/0141005 A1 * | 7/2003 | Donatti et al. | 156/79 |
| 2008/0135167 A1 * | 6/2008 | Simmons et al. | 156/245 |

FOREIGN PATENT DOCUMENTS

| | | |
|---|---|---|
| EP | 640467 | 3/1995 |
| EP | 0671259 | 9/1995 |
| EP | 774343 | 5/1997 |
| EP | 0949066 | 10/1999 |
| EP | 1013414 A2 | 6/2000 |
| EP | 1013414 A3 | 7/2000 |

* cited by examiner

VEHICLE PANEL WITH REINFORCEMENT LAYER

BACKGROUND OF THE INVENTION

1. Field of the Invention

The present invention relates in general to a vehicle panel structure, and in particular to a vehicle panel structure that includes a core layer and a reinforcement layer made of a polypropylene/fiberglass material to provide dimensional stability to the vehicle panel structure while reducing the thickness and weight of the vehicle panel structure.

2. Description of the Related Art

A vehicle panel, such as a headliner, is designed to meet or exceed requirements for dimensional stability when exposed to temperatures of 160° C. over a 24-hour time period. To achieve the requirements for dimensional stability, one or more reinforcement layers are included in the design of a conventional vehicle panel, such as a headliner. Unfortunately, one problem associated with conventional vehicle panels with one or more reinforcement layers to achieve the necessary dimensional stability requirements is that the reinforcement layers is bulky and unnecessarily increases the thickness and weight associated with the vehicle panel.

SUMMARY OF THE INVENTION

The inventor of the present invention has recognized these and other problems associated with conventional vehicle panels, and have developed a vehicle panel comprising a core layer and a reinforcement layer comprised of intermingled strands of fiberglass material and a polymer material having a density in a range between about 50 and 200 g/m$^2$.

DESCRIPTION OF THE PREFERRED EMBODIMENT

Figure 1:
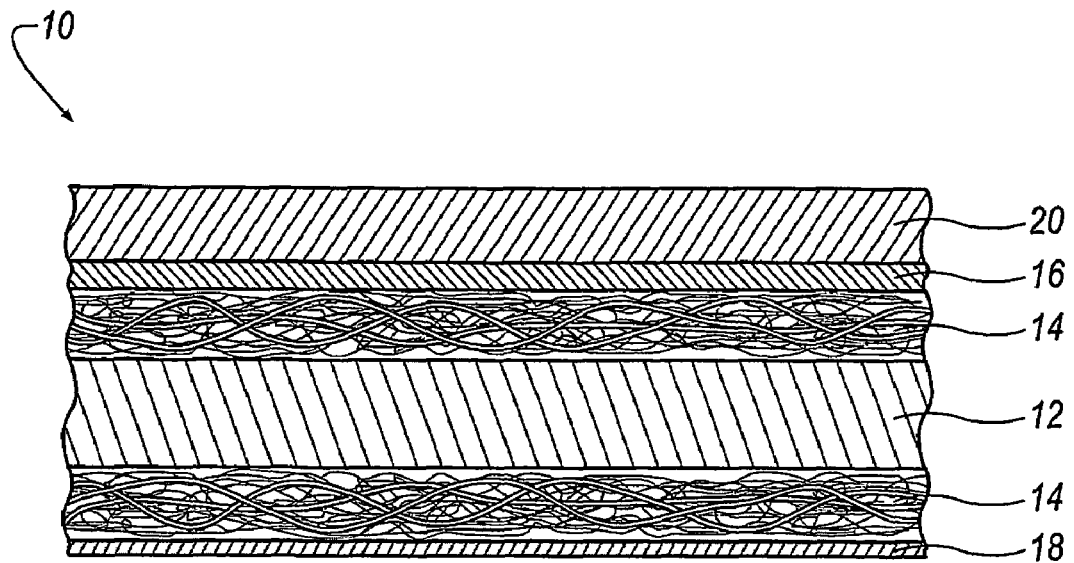
FIG. 1 shows a cross-sectional view of a vehicle panel structure including a core layer with a reinforcement layer according to an embodiment of the invention.

Referring now to FIG. 1, a vehicle panel 10 is shown according to an embodiment of the invention. The vehicle panel 10 includes a core layer 12 and a reinforcement layer 14 positioned adjacent the core layer 12. Although the illustrated embodiment shows two reinforcement layers 14 positioned on opposite sides of the core layer 12, the invention can be practiced with a single reinforcement layer 14 positioned adjacent one side of the core layer 12.

The core layer 12 may be made of any desirable material. Preferably, the core layer 12 is comprised of any suitable material having insulating properties. For example, the core layer 12 may comprise a foam material, such as polypropylene or the like, and have a density and thickness that may vary depending on the design requirements. However, it will be appreciated that the core layer 12 can comprise any suitable material, such as polyethylene terephthalate (PET) or the like, depending on the design requirements.

The vehicle panel 10 may also include an adhesive layer 16, such as a 2-part adhesive film known in the art, applied between the reinforcement layer 14 and a cover material 20. The cover material 20 provides an aesthetically pleasing appearance, typically known as the "A" surface, to the vehicle panel 10. The cover material 20 may be comprised of any desirable material known in the art that provides an aesthetically pleasing appearance to the vehicle panel 10.

A scrim material 18 may be applied to the opposite side of the core layer 12 from the cover material 20. The scrim material 18 may be comprised of any desirable material known in the art. In the illustrated embodiment, the reinforcement layer 14 is disposed between the core layer 12 and the scrim material 18. However, it will be appreciated that the invention is not limited by the reinforcement layer 14 and scrim material 18, and that the invention can be practiced without the reinforcement layer 14 and scrim material 18 being applied to one side of the core layer 12. In addition, it should be noted that in the illustrated embodiment, the reinforcement layer 14 is not attached to either side of the core layer 12, and is capable of easily being separated from the core layer 12 if necessary.

Figure 2:
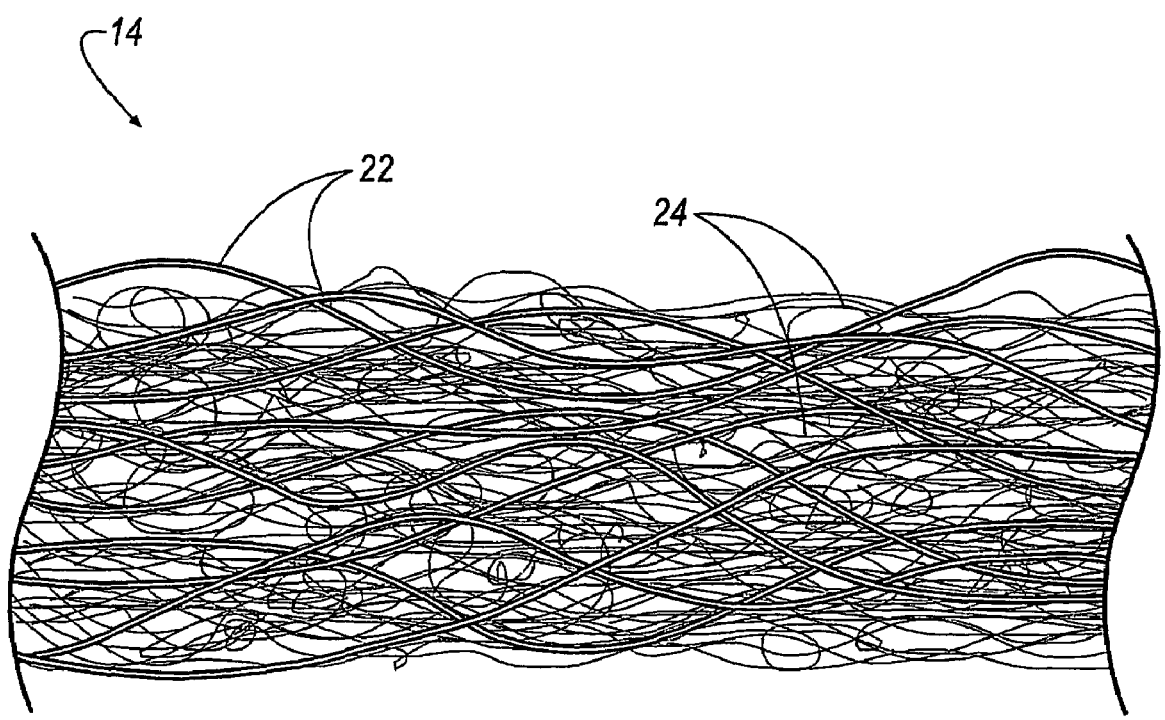
FIG. 2 shows an enlarged view of the reinforcement layer according to the invention.

One aspect of the invention is that the reinforcement layer 14 provides dimensional stability to the vehicle panel 10, while decreasing the overall weight and thickness of the vehicle panel 10, as compared to conventional vehicle panels. For example, the reinforcement layer 14 has a density in a range between about 50 and 200 g/m$^2$, as compared to typical reinforcement layers that may have a density of at least 400 g/m$^2$. To accomplish this aspect of the invention, the reinforcement layer 14 of the invention comprises strands of fiberglass material 22 intermingled with a polymer material 24 to form a blended composition, as shown in FIG. 2. In one embodiment of the invention, the fiberglass material 22 comprises approximately 20% to 80% by weight of the reinforcement layer 14.

Preferably, the polymer material used for the reinforcement layer 14 is compatible with the material used for the core layer 12 such that the reinforcement layer 14 can form a bond with the core layer 12. The polymer material 24 is preferably a high temperature polymer such that, upon an application of heat at a suitably low temperature, the adhesive layer 16 melts and adheres to the layers 14, 16 and 20 to each other, but not at a high enough temperature to melt the reinforcement layer 14, thereby allowing the reinforcement layer 14 to be easily separated from the core layer 12. One suitable high temperature polymer material 24 compatible with the material for the cover layer 12 is polypropylene, or the like. However, a low temperature polymer material may be included in the reinforcement layer 14 to act as a binder material to bond the reinforcement layer 14 to the core layer 12, if necessary.

One application of the vehicle panel 10 of the invention is a headliner for a vehicle. A headliner is designed to meet or exceed requirements for dimensional stability when exposed to temperatures of 160° C. over a 24-hour time period. It has been found that when the core layer 12 with reinforcement layer 14 exhibits dimensional stability when exposed to a temperature of 160° C. over a 24-hour time period, as compared to conventional headliners that are designed with a heavier, thicker reinforcement layer. Thus, the vehicle panel 10 comprising the core layer 12 with reinforcement layer 14 can provide the same or better dimensional stability as a conventional headliner, while decreasing the weight and thickness of the conventional headliner.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicle panel, comprising:
a core layer; and
a reinforcement layer comprised of intermingled strands of fiberglass material and a polymer material, wherein the reinforcement layer has a density in a range between about 50 and 200 g/m²a, wherein approximately 20% to 80% by weight of the reinforcement layer is comprised of strands of the fiberglass material.

2. The vehicle panel of claim 1, wherein the polymer material comprises polypropylene material.

3. The vehicle panel of claim 2, wherein the polypropylene comprises polyethylene terepthalate (PET) material.

4. The vehicle panel of claim 1, wherein said core layer is made of an insulating material.

5. The vehicle panel of claim 4, wherein said core layer comprises polypropylene material.

6. The vehicle panel of claim 1, wherein said vehicle panel comprises a headliner.

7. The vehicle panel of claim 1, wherein the reinforcement layer further comprises a binder material.

8. The vehicle panel of claim 7, wherein the binder material comprises a low temperature polymer material.

9. The vehicle panel of claim 1, further comprising an adhesive layer adjacent the reinforcement layer.

10. The vehicle panel of claim 9, further comprising a cover material adjacent the adhesive layer.

11. The vehicle panel of claim 1, further comprising a scrim material adjacent the reinforcement layer.

12. A vehicle panel, comprising:
a care layer having a first side and a second side;
a first reinforcement layer arranged on the first side of the core layer; and
a second reinforcement layer arranged on the second side of the core layer; wherein at least one of the first reinforcement layer and the second reinforcement layer includes strands of fiberglass material intermingled with a polymer material, and wherein at least one of the first reinforcement layer and the second reinforcement layer has a density in a range between about 50 and 200 g/m².

13. The vehicle panel of claim 12, wherein both of the first reinforcement layer and the second reinforcement layer include strands of fiberglass material intermingled with a polymer material.

14. The vehicle panel of claim 13, wherein both of the first reinforcement layer and the second reinforcement layer have a density in a range between about 50 and 200 g/m².

15. The vehicle panel of claim 12, wherein both of the first reinforcement layer and the second reinforcement layer have a density in a range between about 50 and 200 g/m².

16. The vehicle panel of claim 15, wherein both of the first reinforcement layer and the second reinforcement layer include strands of fiberglass material intermingled with a polymer material.

* * * * *